(12) United States Patent
Yeung et al.

(10) Patent No.: US 11,436,694 B2
(45) Date of Patent: Sep. 6, 2022

(54) TRANSPORTATION SYSTEM USING ODOR PREFERENCES

(71) Applicant: Ford Global Technologies, LLC, Dearborn, MI (US)

(72) Inventors: Jeffrey Brian Yeung, Canton, MI (US); Perry Robinson Macneille, Lathrup Village, MI (US); Omar Makke, Oakland, MI (US); Patrick Lawrence Jackson Van Hoecke, Westland, MI (US); Oleg Yurievitch Gusikhin, West Bloomfield, MI (US); Yimin Liu, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 309 days.

(21) Appl. No.: 16/611,531

(22) PCT Filed: May 10, 2017

(86) PCT No.: PCT/US2017/031845
§ 371 (c)(1),
(2) Date: Nov. 7, 2019

(87) PCT Pub. No.: WO2018/208297
PCT Pub. Date: Nov. 15, 2018

(65) Prior Publication Data
US 2020/0111189 A1 Apr. 9, 2020

(51) Int. Cl.
*G06Q 50/30* (2012.01)
*G06F 16/23* (2019.01)
(Continued)

(52) U.S. Cl.
CPC .......... *G06Q 50/30* (2013.01); *G05D 1/0297* (2013.01); *G06F 16/2379* (2019.01);
(Continued)

(58) Field of Classification Search
CPC ........ G06Q 50/30; G06Q 10/02; G06Q 10/06; G06F 16/2379; G05D 1/0297; G05D 2201/0212
(Continued)

(56) References Cited

U.S. PATENT DOCUMENTS

| 4,711,159 A | 12/1987 | Armbruster |
| 5,192,346 A | 3/1993 | Kowalczyk |

(Continued)

FOREIGN PATENT DOCUMENTS

| CA | 2307443 A1 | 11/2000 |
| WO | WO2016034209 A1 | 3/2016 |
| WO | WO2017021395 A1 | 2/2017 |

OTHER PUBLICATIONS

Tourism management by Heesup Han Published in 2013 (Year: 2013).*
International Search Report of the International Searching Authority for PCT/US2017/031845 dated Jul. 19, 2017.

*Primary Examiner* — Zeina Elchanti
(74) *Attorney, Agent, or Firm* — Brandon Hicks; Bejin Bieneman PLC

(57) ABSTRACT

A system includes a computer remote from a vehicle. The computer is programmed to store a label of an odor associated with a user, instruct the vehicle to pick up the user, receive data from an environmental sensor in the vehicle, and output a message upon determining that the data indicate that a level of the odor exceeds a threshold.

20 Claims, 5 Drawing Sheets

(51) Int. Cl.
*G05D 1/02* (2020.01)
*G06Q 10/02* (2012.01)
*G06Q 10/06* (2012.01)

(52) U.S. Cl.
CPC ............. *G06Q 10/02* (2013.01); *G06Q 10/06* (2013.01); *G05D 2201/0212* (2013.01)

(58) Field of Classification Search
USPC .......................................................... 705/5
See application file for complete search history.

(56) References Cited

U.S. PATENT DOCUMENTS

| | | | |
|---|---|---|---|
| 5,292,218 A | 3/1994 | Ikenouchi et al. | |
| 6,693,546 B2 | 2/2004 | Skardon | |
| 8,350,722 B2 | 1/2013 | Tewari et al. | |
| 8,448,739 B2 | 5/2013 | Kolich | |
| 8,950,238 B2 | 2/2015 | Shaw et al. | |
| 9,124,955 B2 * | 9/2015 | Geva | B60K 28/066 |
| 2003/0177020 A1 * | 9/2003 | Okamura | G06Q 10/02 |
| | | | 705/5 |
| 2012/0107172 A1 | 5/2012 | Ono et al. | |
| 2013/0066688 A1 | 3/2013 | Pinkus | |
| 2014/0060150 A1 | 3/2014 | Shaw et al. | |
| 2015/0081362 A1 * | 3/2015 | Chadwick | G06Q 50/30 |
| | | | 705/7.14 |
| 2015/0375187 A1 * | 12/2015 | Yates | A61L 9/205 |
| | | | 244/118.5 |
| 2016/0096412 A1 * | 4/2016 | Mankame | B60H 1/00792 |
| | | | 165/11.2 |
| 2017/0021395 A1 | 1/2017 | Gromes, Sr. | |
| 2017/0076511 A1 | 3/2017 | Busch-Sorensen et al. | |
| 2017/0210289 A1 * | 7/2017 | Dhawan | A61B 5/6844 |
| 2017/0270447 A1 | 9/2017 | Borean et al. | |
| 2018/0057013 A1 * | 3/2018 | Mullett | B60H 1/267 |
| 2018/0074494 A1 * | 3/2018 | Myers | G06K 9/00288 |
| 2018/0202822 A1 * | 7/2018 | DeLizio | G01C 21/3438 |
| 2018/0214823 A1 | 8/2018 | Faudry et al. | |
| 2018/0315146 A1 * | 11/2018 | Matthiesen | G06Q 10/06315 |
| 2019/0286131 A1 * | 9/2019 | Sasaki | B60W 50/08 |
| 2019/0288868 A1 * | 9/2019 | Mosalem | B60R 16/037 |

* cited by examiner

TRANSPORTATION SYSTEM USING ODOR PREFERENCES

BACKGROUND

Users may be able to obtain at best limited information about ride-share vehicles such as taxis, rental cars, and vehicles provided as part of a "transportation as a service" (TaaS) system. For example, a user requesting an on-demand transportation service may receive information limited to identifying information such as the driver's name and the vehicle's make, model, color, and license plate number, and possibly also ratings based on feedback from prior customers. Technical architectures are lacking to obtain other information that could be important to a user. For example, a user could have an allergy or preference about the environment in which they travel, but mechanisms are lacking to convey interior environmental information about a vehicle proposed for providing a ride service.

DETAILED DESCRIPTION

Figure 1:
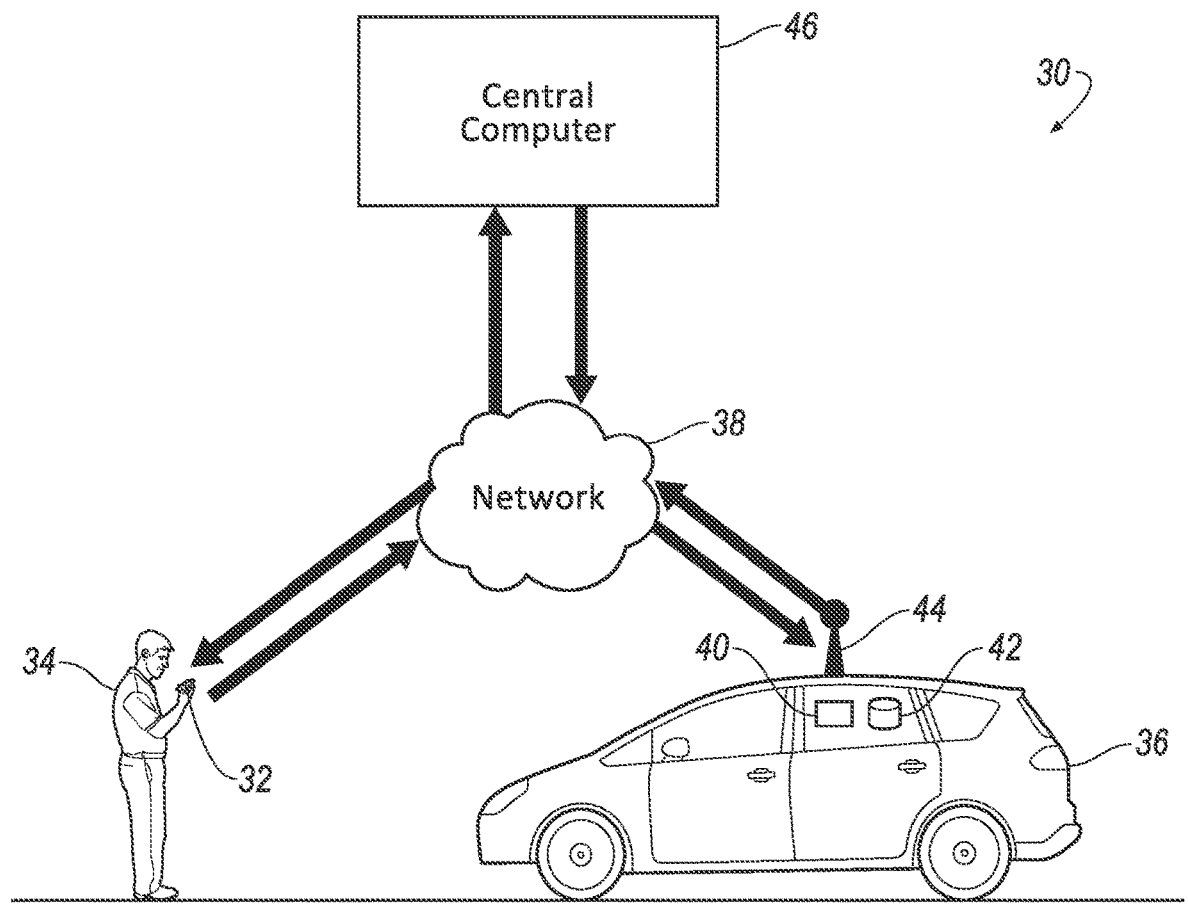
FIG. 1 is a diagram of an exemplary transportation-as-a-service system.

The transportation system described below provides a technical solution for obtaining information about odors inside a vehicle and including that information as a basis for a user's request for transportation. The transportation system may provide a reliably pleasant environment for the user while riding and may reduce harm to the user through, e.g., allergic reactions to the vehicle environment.

A system includes a computer remote from a vehicle. The computer is programmed to store a label of an odor associated with a user, instruct the vehicle to pick up the user, receive data from an environmental sensor in the vehicle, and output a message upon determining that the data indicate that a level of the odor exceeds a threshold.

The computer may be further programmed to receive a rejection input rejecting a ride from the vehicle after outputting the message. The computer may be further programmed to receive the threshold, and associate the threshold with the label and the user. The computer may be further programmed to refrain from outputting the message upon determining that the data indicate that the level of the odor is below the threshold. The computer may be further programmed to store a plurality of labels of odors and a plurality of thresholds associated with the respective labels, and output messages for each odor for which the environmental data indicate a respective level of the odor exceeds the respective threshold. The computer may be further programmed to instruct a next available vehicle to pick up the user upon receiving the rejection input.

The environmental sensor may be one of a spectrometer, a chromatograph, a metal-oxide semiconductor sensor, a metal-oxide semiconductor field effect transistor sensor, a conducting polymer gas sensor, a piezoelectric sensor, an optical sensor, and a bioassay.

The odor may be an allergen.

The data may include a plurality of labels of odors and a plurality of respective levels.

A method includes storing a label of an odor associated with a user in a memory remote from a vehicle, instructing the vehicle to pick up the user, receiving data from an environmental sensor in the vehicle, and outputting a message upon determining that the environmental data indicate that a level of the odor exceeds a threshold.

The method may include receiving a rejection input rejecting a ride from the vehicle after outputting the message. The method may include receiving the threshold, and associating the threshold with the odor label and the user. The method may include refraining from outputting the message upon determining that the data indicate that the level of the odor is below the threshold. The method may include storing a plurality of labels of odors and a plurality of thresholds associated with the respective labels, and outputting messages for each odor for which the environmental data indicate a respective level of the odor exceeds the respective threshold. The method may include instructing a next available vehicle to pick up the user upon receiving the rejection input.

The environmental sensor may be one of a spectrometer, a chromatograph, a metal-oxide semiconductor sensor, a metal-oxide semiconductor field effect transistor sensor, a conducting polymer gas sensor, a piezoelectric sensor, an optical sensor, and a bioassay.

The odor may be an allergen.

The data may include a plurality of labels of odors and a plurality of respective levels.

With reference to FIG. 1, a transportation-as-a-service (TaaS) system 30 includes a plurality of remote computers 32 belonging to users 34, a plurality of vehicles 36, and a central computer 46, all in communication through a network 38. The users 34 can use the remote computers 32 to request rides from the vehicles 36, and the vehicle 36 can respond to the requests. (For ease of illustration FIG. 1 shows one of each of a user 34, remote computer 32, and vehicle 36.)

The vehicle 36 is capable of transporting passengers such as the user 34. The vehicle 36 includes a vehicle computer 40, an environmental sensor 42, and a transceiver 44 all in communication via a vehicle network such as a vehicle communications bus or other vehicle wired or wireless network.

The remote computer 32, the central computer 46, and the vehicle computer 40 are microprocessor-based computers, i.e., including a processor, a memory, etc. The memories may store instructions executable by the processor as well as data, e.g., as discussed herein. The remote computer 32, the central computer 46, and the vehicle computer 40 may each be a single computer or may be multiple computers in communication. For ease of illustration, one remote computer 32, one central computer 46, and one vehicle computer 40 are shown in FIG. 1 and discussed herein. The remote computer 32 may be in, e.g., a mobile device such as a smartphone or tablet, which is equipped for wireless communications, as described with respect to the network 38 below.

The network 38 represents one or more mechanisms by which one of the computers 32, 40, 46 may communicate with a remote server, e.g., another of the computers 32, 40, 46. For example, the network 38 may put the remote computer 32 in communication with the vehicle computer 40, perhaps with the central computer 46 routing messages as an intermediary. The network 38 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). The computers 32, 40, 46 may be connected by digital radio that support packet-switched technology. Employment of a stationary networking infrastructure may support these connections. Many implementations are known in the art, and can be described with the Open System Interconnect model. Lower-level implementations may be described by the IEEE 802 family of protocols and by the 3rd Generation Partnership Project (3GPP) recommendations. Middle-level implementations may be described by the Internet protocol suit and International Telegraph Union (ITU) ITU-T standard protocol suite. High-level implementation may be described by SAE J2735, World Wide Web Consortium (W3C), and/or documentation from the Internet Engineering Task Force.

The environmental sensor 42 is configured to detect odors, for example, by detecting chemical signatures from airborne molecules. The environmental sensor 42 may be disposed in a passenger cabin of the vehicle 36 or have an airflow connection to the passenger cabin of the vehicle 36, such as via a vent leading from the passenger cabin. The environmental sensor 42 may thus detect odors that would be experienced by an occupant of the vehicle 36. The environmental sensor 42 may be, e.g., a mass spectrometer, a metal-oxide semiconductor sensor, a metal-oxide semiconductor field effect transistor sensor, a conducting polymer gas sensor, a piezoelectric sensor, an optical sensor, or a bioassay.

The transceiver 44 is typically a conventional component and is provided to transmit signals wirelessly through any suitable wireless communication protocol, such as Bluetooth, WiFi, 802.11a/b/g, other RF (radio frequency) protocol, etc. The transceiver 44 may be adapted to communicate with a remote server, that is, a server distinct and spaced from the vehicle 36. The remote server may be located outside the vehicle 36. For example, the remote server may be associated with the central computer 46, the remote computers 32, other vehicles (e.g., V2V communications), infrastructure components (e.g., V2I communications), emergency responders, etc.

The central computer 46 is programmed to receive a request for a ride from a remote computer 32. The central computer 46 may be programmed to, upon receiving a ride request, assign a vehicle 36 to a remote computer 32 that has requested a ride. The central computer 46 may be programmed to, e.g., assign the vehicle 36 nearest to the remote computer 32 or the vehicle 36 with the shortest travel time to the remote computer 32. The central computer 46 may be programmed to, upon assigning a vehicle 36, send notifications to the requesting remote computer 32 and to the assigned vehicle 36. If either the remote computer 32 or the vehicle 36 sends a cancellation request, the central computer 46 may be programmed to assign a different vehicle 36 to the remote computer 32.

Figure 2:
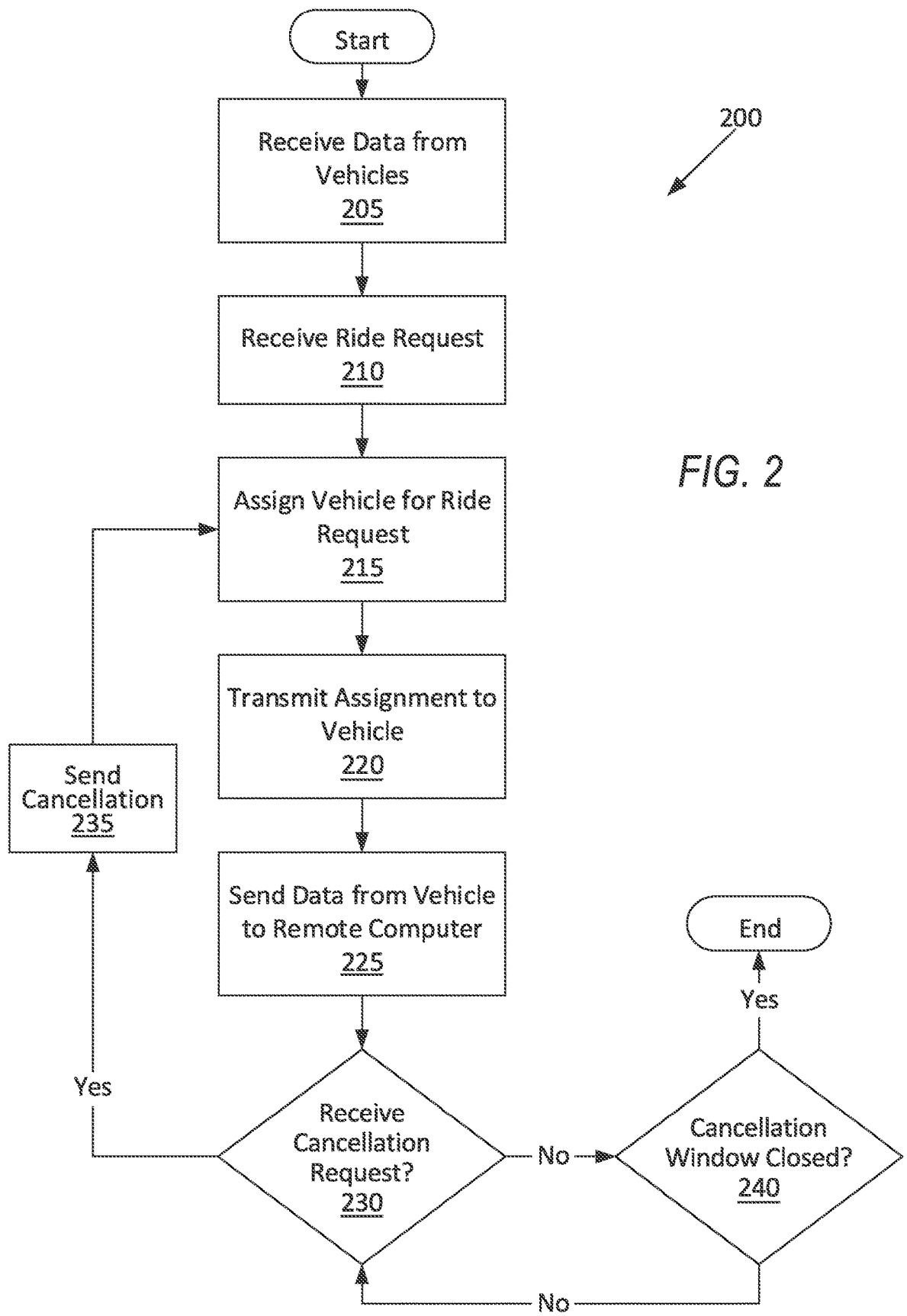
FIG. 2 is a process flow diagram of an exemplary process for assigning a vehicle in response to a request for a ride.

FIG. 2 is a process flow diagram illustrating an exemplary process 200 for assigning a vehicle in response to a request for a ride. The central computer 46 may be programmed to perform the steps of the process 200.

The process 200 begins in a block 205, in which the central computer 46 receives data from the vehicle 36 via the transceiver 44 and the network 38. The data from each vehicle 36 includes location data (e.g., geodetic coordinates of a present location of the vehicle 36), whether the vehicle 36 is available for a ride, and data from the environmental sensor 42. This data concerning one or more odors in the vehicle 36 may include one or more labels of odors and respective levels of the odors. The label may be, e.g., a word designating an odor such as "tobacco," or the label may be a code designating the odor that is standard throughout the TaaS system 30 and stored in a memory of the computers 32, 40, 46. The level may be a concentration of the odor, measured in, e.g., parts per million (ppm). The data may include all odors of interest or only odors for which the level is above a negligible amount. A negligible amount is defined for purposes of this disclosure as an amount below the lowest amount known to cause adverse reactions and/or to be detectable by human senses.

Next, in a block 210, the central computer 46 receives a ride request from the remote computer 32 via the network 38. The ride request includes the location of the remote computer 32, identifying information on the user 34, etc.

Next, in a block 215, the central computer 46 assigns one of the vehicles 36 to fulfill the ride request. The central computer 46 may, e.g., assign the vehicle 36 nearest to the remote computer 32, and/or the vehicle 36 with the shortest travel time to fulfill the ride request from the remote computer 32. If the remote computer 32 has previously canceled a ride request, the central computer 46 selects one of the vehicles 36 other than the vehicle 36 previously assigned to fulfill the ride request. If the vehicle 36 has previously canceled a ride assignment, the central computer 46 selects one of the vehicles 36 other than the vehicle 36 that canceled the ride assignment.

Next, in a block 220, the central computer 46 transmits the assignment to the vehicle 36. The central computer 46 may send the information received from the remote computer 32.

Next, in a block 225, the central computer 46 sends data about the assigned vehicle 36 to the remote computer 32. The data includes the location of the vehicle 36; the name of the driver of the vehicle 36, if any; and the make, model, color, and license plate number of the vehicle 36; a rating based on feedback from prior customers for the driver, if any; and the data from the environmental sensor 42.

Next, in a decision block 230, the central computer 46 determines whether the central computer 46 has received a cancellation request, either from the remote computer 32 or from the vehicle 36. If a cancellation window has closed without receiving confirmations from the remote computer 32 and from the vehicle 36, the central computer 46 may treat the situation as though the central computer 46 received a cancellation request. If the central computer 46 has not received a cancellation request, the process 200 proceeds to a decision block 240.

If the central computer 46 has received a cancellation request, after the decision block 230, in a block 235, the central computer sends a cancellation to the party from whom the cancellation request did not originate, that is, to the remote computer 32 if the vehicle 36 sent the cancellation request and to the vehicle 36 if the remote computer 32 sent the cancellation request. After the block 235, the process 200 returns to the block 215.

If the central computer 46 has not received a cancellation request, after the decision block 230, in a decision block 240, the central computer 46 determines whether a cancellation window is closed. The cancellation window is a period in which the remote computer 32 or the vehicle 36 are permitted to cancel the ride request. The cancellation window may be, e.g., a preset duration, a minimum distance between the remote computer 32 and the vehicle 36, etc. The cancellation window may be closed by receiving confirmations from the remote computer 32 and from the vehicle 36. If the cancellation window is still open (or if the cancellation window is closed without receiving the confirmations), the process 200 returns to the decision block 230 to continue waiting for a cancellation request. If the cancellation window is closed (such as if the central computer 46 has received the confirmations), the process 200 ends, and the vehicle 36 fulfills the ride request of the remote computer 32.

Figure 3:
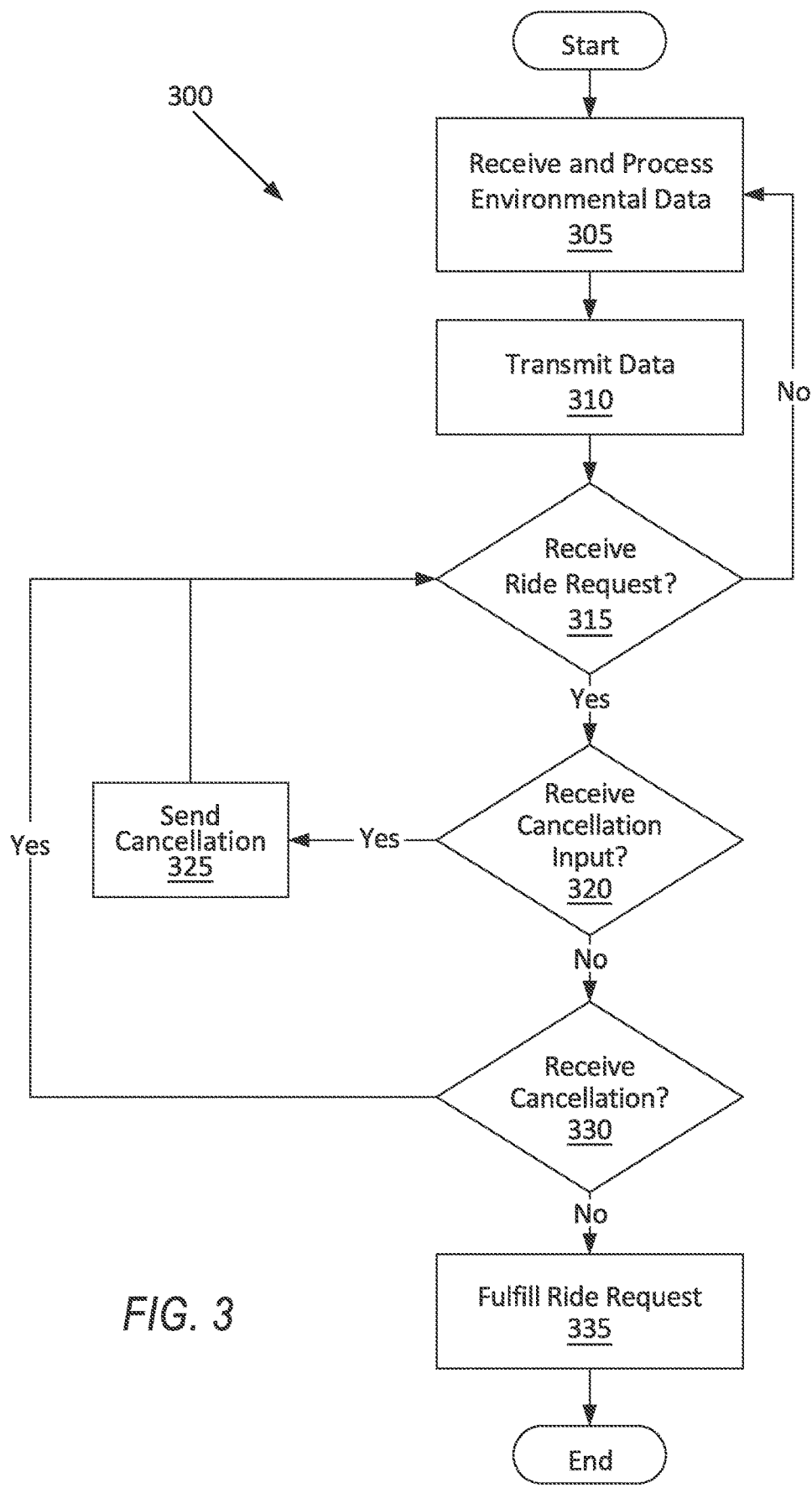
FIG. 3 is a process flow diagram of an exemplary process for responding to a request for a ride.

FIG. 3 is a process flow diagram of an exemplary process 300 for responding to a request for a ride. The vehicle computer 40 may be programmed to perform the steps of the process 300.

The process 300 begins in a block 305, in which the vehicle computer 40 receives and processes environmental data from the environmental sensor 42. The memory of the vehicle computer 40 may store data, e.g., in a lookup table or the like, with records that identify respective odors and their chemical signatures. The vehicle computer 40 can be programmed to compare a chemical signature detected by the environmental sensor 42 with chemical signatures stored in the database to identify the odor. For another example, the vehicle computer 40 may use machine learning. The vehicle computer 40 may receive subjective reports from occupants of the vehicle 36 of the odors that the occupants smelled, and the vehicle computer 40 may learn to apply labels of the odors to the chemical signatures and concentrations detected. For another example, the vehicle computer 40 may use an iterative process with the environmental sensor 42. The environmental sensor 42 may detect levels of each of a set of compounds. The vehicle computer 40 may use those levels to select a set of candidate odors and then instruct the environmental sensor 42 to detect levels of a new set of compounds. The vehicle computer 40 uses the levels of the new set of compounds to select the odor from the set of candidate odors or to further narrow the set of candidate odors, followed by another iteration. The vehicle computer 40 may also use combinations of these algorithms (i.e., looking up chemical signatures, machine learning, and iterative processes) and/or other algorithms. Odors detected by the environmental sensor 42 and identified by the vehicle computer 40 may include allergens such as pollen, flowers, perfumes, colognes, scented lotions or sprays, peanuts, pet dander, animal smells, mold, cigarette smoke; alcohol; food-related smells such as fried food or seafood; garbage; etc.

Next, in a block 310, the vehicle computer 40 sends data to the central computer 46. The data includes a location of the vehicle 36, whether the vehicle 36 is available for a ride, and data from the environmental sensor 42, as described above with respect to the block 205 of the process 200, in which the central computer 46 receives the data.

Next, in a decision block 315, the vehicle computer 40 determines whether the vehicle computer 40 has received a ride request. If the vehicle computer 40 has not received a ride request, the process 300 returns to the block 305; in other words, the vehicle computer 40 can be substantially continuously receiving and processing environmental data and sending data to the central computer 46.

If the vehicle computer 40 receives a ride request, after the decision block 315, in a decision block 320, the vehicle computer 40 determines whether the vehicle computer 40 received a cancellation input, that is, a driver of the vehicle 36 chooses to cancel the ride request. If the vehicle computer 40 does not receive cancellation input, the process 300 proceeds to a decision block 330.

If the vehicle computer 40 receives a cancellation input, after the decision block 320, in a block 325, the vehicle computer 40 transmits the cancellation to the central computer 46, which may be received in the decision block 230 of the process 200.

If the vehicle computer 40 does not receive the cancellation input, after the decision block 320, in the decision block 330, the vehicle computer 40 determines whether the vehicle computer 40 received a cancellation from the central computer 46, that is, the user 34 canceled the ride request (sent in the block 235 of the process 200). If the vehicle computer 40 received the cancellation, the process 300 returns to the decision block 315 to continue monitoring for ride requests.

If the vehicle computer 40 does not receive the cancellation, after the decision block 330, in a block 335, the vehicle computer 40 proceeds to fulfill the ride request for the user 34. The vehicle computer 40 may send a confirmation to the central computer 46 upon reaching the block 330 or earlier if the vehicle computer 40 receives an input to send a confirmation. After the block 335, the process 300 ends.

Figure 4:
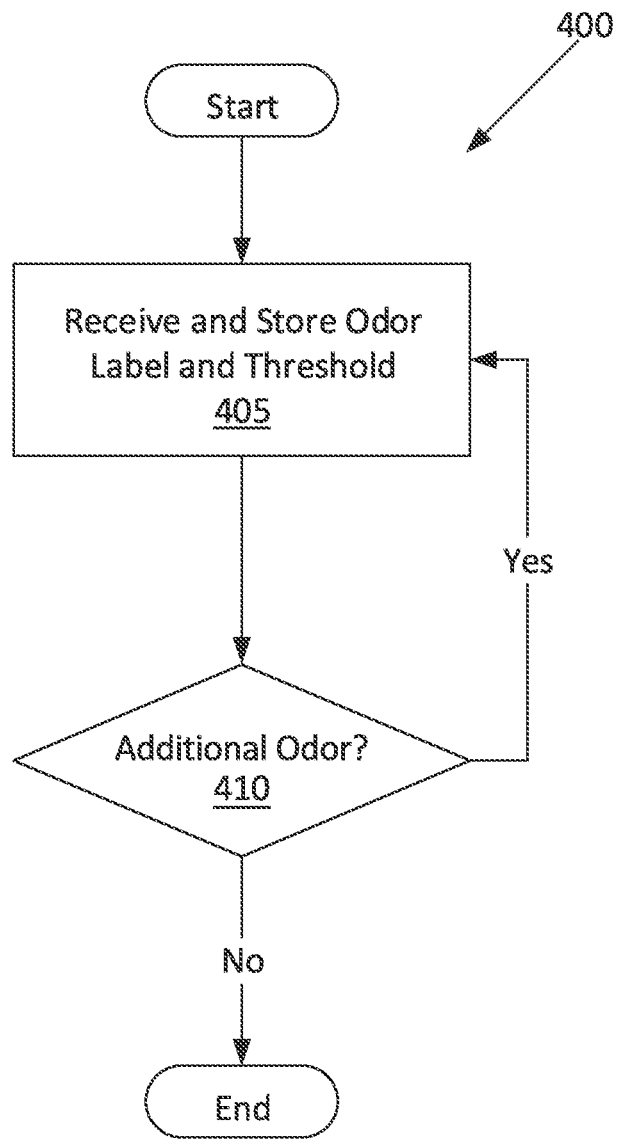
FIG. 4 is a process flow diagram of an exemplary process for inputting a user's odor preferences.

FIG. 4 is a process flow diagram illustrating an exemplary process 400 for inputting odor preferences of the user 34. The remote computer 32 may be programmed to perform the steps of the process 400.

The process 400 begins in a block 405, in which the remote computer 32 receives and stores a label of an odor and a threshold for the odor. The label and the threshold may be input by the user 34. Alternatively or additionally, the remote computer 32 may store personal data, e.g., medical records, of the user 34, and the remote computer 32 may locate, e.g., allergies disclosed therein. The label, the threshold, and the user 34 are associated with each other in the memory of the remote computer 32. The label and the threshold may be stored in, e.g., a table. The threshold may be a concentration of the odor, i.e., chemical signature(s) as described above, measured in, e.g., parts per million (ppm). The user 34 may directly input the threshold as a concentration or may select a qualitative amount, e.g., "none," "light," "moderate," etc. The remote computer 32 may translate the qualitative amount to a concentration. For example, the remote computer 32 may refer to a stored table or the like having concentrations corresponding to qualitative amounts for each odor label.

Next, in a decision block 410, the remote computer 32 determines whether there are any additional odors for which the remote computer 32 is to store the corresponding label and threshold. If there are additional odors, the process 400 returns to the block 405 to store the label and threshold for the next odor. The remote computer 32 may thus store a plurality of labels of odors and a plurality of thresholds associated with the respective labels. The remote computer 32 may accept the input of multiple labels and thresholds from the user 34 in any suitable manner. For example, the remote computer 32 may allow the user 34 to perform a text search for odors or may prompt the user 34 with a list of commonly selected odors. If there are not additional odors, the process 400 ends.

Figure 5:
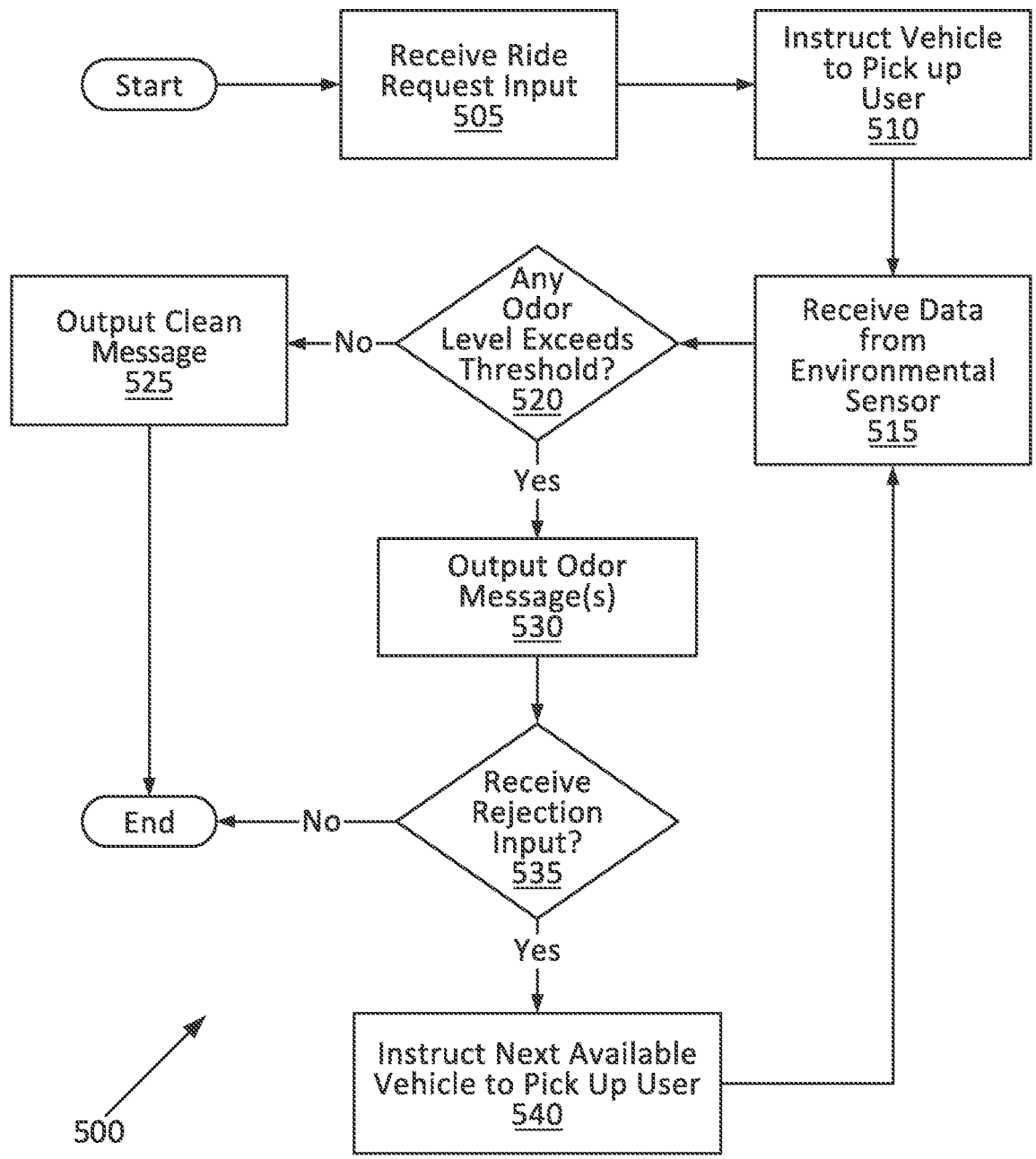
FIG. 5 is a process flow diagram of an exemplary process for requesting a ride based on the user's odor preferences.

FIG. 5 is a process flow diagram of an exemplary process 500 for requesting a ride based on the odor preferences of the user 34. The remote computer 32 may be programmed to perform the steps of the process 500.

The process 500 begins in a block 505, in which the remote computer 32 receives input from the user 34 instructing the remote computer 32 to request a ride. The input may include, e.g., a destination for the ride.

Next, in a block 510, the remote computer 32 instructs the vehicle 36 to pick up the user 34. Specifically, the remote computer 32 may transmit a request to the central computer 46 for a ride, receiving by the central computer 46 in the block 210 in the process 200 above.

Next, in a block 515, the remote computer 32 receives data from the environmental sensor 42 in the vehicle 36. For example, the vehicle computer 40 may transmit a message through the network 38 to the central computer 46, and the central computer 46 may forward the message through the network 38 to the remote computer 32, as explained in reference to the block 310 of the process 300 and the block 225 of the process 200. This data concerning one or more odors in the vehicle 36 may include one or more labels of odors and respective levels of the odors. The data may include all odors of interest or only odors for which the level is above a negligible amount.

Next, in a decision block 520, the computer determines whether any of the levels of the odors exceed the respective specified user threshold for that odor. If the data indicate that the level of at least one odor exceeds the threshold for that odor, the process 500 proceeds to the block 530.

If the data indicate that the levels of all the odors are below the corresponding thresholds, next, in a block 525, the remote computer 32 outputs a message to the user 34 confirming that the vehicle 36 is "clean" or has at most negligible odors. The message indicating that the vehicle is clean may include the levels of some odors or qualitative translations of the levels. The qualitative translations may be expressed as ordinal coordinates such as "horrible," "bad," "acceptable," "good," and "pleasant." After the block 525, the process 500 ends, and the originally scheduled vehicle 36 picks up the user 34.

If the data indicate that at least one of the levels of the odors exceeds the corresponding threshold, next, in the block 530, the remote computer 32 outputs messages for each odor for which the data indicate the respective level of the odor exceeds the respective threshold. For example, if the level of the odor labeled "tobacco" and the level of the odor labeled "cat dander" exceed their respective thresholds but the other odors do not, then the remote computer 32 outputs a message that the level of "tobacco" is above the threshold and the level of "cat dander" is above the threshold. The remote computer 32 outputs the message in any manner that communicates the message to the user 34. The remote computer 32 may, e.g., display the message on a screen. The message may include the levels of the excessive odors or qualitative translations of the levels, and the message may include the thresholds or qualitative translations of the thresholds. The qualitative translations may be expressed as ordinal coordinates such as "horrible," "bad," "acceptable," "good," and "pleasant."

Next, in a decision block 535, the remote computer 32 determines whether the remote computer 32 received a rejection input rejecting the ride after outputting the message. For example, the message may include a prompt for the user 34 to cancel the ride, or the user 34 may use a prompt to cancel the ride that appears regardless of the message. The remote computer 32 may include a cancellation window for entering the rejection input. The cancellation window may be a preset value or may depend on an amount of time for the vehicle 36 to travel to the user 34. The cancellation window may correspond to the cancellation window of the central computer 46, described with respect to the decision block 240 of the process 200. The remote computer 32 may fail to receive the rejection input if either the cancellation window closes or if the user 34 enters a confirmation input. If the remote computer 32 does not receive the rejection input, the process 500 ends, and the originally scheduled vehicle 36 picks up the user 34. The remote computer 32 may send a confirmation to the central computer 46 upon not receiving a confirmation input.

If the remote computer 32 receives the rejection input, next, in a block 540, the remote computer 32 instructs a next available vehicle 36 to pick up the user 34. Specifically, the remote computer 32 may transmit a request to the central computer 46 for a new ride, and the central computer 46 may select one of the vehicles 36 other than the current vehicle 36 and instruct the new vehicle 36 to pick up the user 34, as described with respect to the block 215 of the process 200. After the block 540, the process 500 proceeds to the block 515 to repeat the blocks 515-540 for the new vehicle 36. The process may repeat the blocks 515-540 until a vehicle 36 satisfying the odor preferences of the user 34 is selected.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a computer remote from a vehicle and programmed to:
store labels of a plurality of respective odors associated with a user in a table as a set of codes designating the respective odors paired with respective chemical signatures of the odors;
instruct the vehicle to pick up the user;
receive data from an environmental sensor in the vehicle, the data identifying respective levels of the respective chemical signatures of the respective odors; and
upon determining that the data indicate that the level of at least one of the odors exceeds a threshold, output a message indicating the labels for the odors whose levels exceed the threshold.

2. The system of claim 1, wherein the computer is further programmed to receive a rejection input rejecting a ride from the vehicle after outputting the message.

3. The system of claim 2, wherein the computer is further programmed to receive a plurality of thresholds including the threshold, and associate the thresholds with the respective labels and the user.

4. The system of claim 3, wherein the computer is further programmed to output a second message upon determining that the data indicate that the levels of all the odors are below the respective thresholds.

5. The system of claim 2, wherein the computer is further programmed to instruct a next available vehicle to pick up the user upon receiving the rejection input.

6. The system of claim 1, wherein the environmental sensor is one of a spectrometer, a chromatograph, a metal-oxide semiconductor sensor, a metal-oxide semiconductor field effect transistor sensor, a conducting polymer gas sensor, a piezoelectric sensor, an optical sensor, and a bioassay.

7. The system of claim 1, wherein at least one of the odors is an allergen.

8. The system of claim 1, wherein the computer is further programmed to store a plurality of thresholds including the threshold, each threshold is stored in the table paired with a respective one of the labels, and determining that the data indicate that the level of at least one of the odors exceeds a threshold includes determining that at least one of the levels exceeds the respective threshold for that level.

9. The system of claim 8, wherein the computer is further programmed to receive inputs from the user specifying the thresholds for the odors.

10. The system of claim 8, wherein the computer is further programmed to store at least one of the thresholds based on receiving allergies of the user.

11. A method comprising:
   storing labels of a plurality of respective odors associated with a user in a table as a set of codes designating the respective odors paired with respective chemical signatures of the odors, wherein the table is in a memory remote from a vehicle;
   instructing the vehicle to pick up the user;
   receiving data from an environmental sensor in the vehicle, the data identifying respective levels of the respective chemical signatures of the respective odors; and
   upon determining that the data indicate that the level of at least one of the odors exceeds a threshold, outputting a message indicating the labels for the odors whose levels exceed the threshold.

12. The method of claim 11, further comprising receiving a rejection input rejecting a ride from the vehicle after outputting the message.

13. The method of claim 12, further comprising receiving a plurality of thresholds including the threshold, and associating the thresholds with the respective labels and the user.

14. The method of claim 13, further comprising refraining from outputting the message upon determining that the data indicate that the levels of all the odors are below the respective thresholds.

15. The method of claim 12, further comprising instructing a next available vehicle to pick up the user upon receiving the rejection input.

16. The method of claim 11, wherein the environmental sensor is one of a spectrometer, a chromatograph, a metal-oxide semiconductor sensor, a metal-oxide semiconductor field effect transistor sensor, a conducting polymer gas sensor, a piezoelectric sensor, an optical sensor, and a bioassay.

17. The method of claim 11, wherein at least one of the odors is an allergen.

18. The method of claim 11, further comprising storing a plurality of thresholds including the threshold, each threshold being stored in the table paired with a respective one of the labels, wherein determining that the data indicate that the level of at least one of the odors exceeds a threshold includes determining that at least one of the levels exceeds the respective threshold for that level.

19. The method of claim 18, further comprising receiving inputs from the user specifying the thresholds for the odors.

20. The method of claim 18, further comprising storing at least one of the thresholds based on receiving allergies of the user.

\* \* \* \* \*